United States Patent [19]
Sugiura

[11] Patent Number: 5,938,982
[45] Date of Patent: Aug. 17, 1999

[54] DEVICE FOR FINING BUBBLES OF GAS CONTAINED IN LIQUID

[76] Inventor: Eiichi Sugiura, 149, Matsumoto-cho, Hekinan, Japan

[21] Appl. No.: 08/929,907

[22] Filed: Sep. 15, 1997

[30] Foreign Application Priority Data

Sep. 20, 1996 [JP] Japan ..................... 8-250241

[51] Int. Cl.⁶ ..................................................... B01F 3/04
[52] U.S. Cl. ......................... 261/75; 261/79.2; 366/339; 366/341
[58] Field of Search ............... 261/75, 76, 79.2; 366/336, 339, 340, 341

[56] References Cited

U.S. PATENT DOCUMENTS

| | | | |
|---|---|---|---|
| 1,373,829 | 4/1921 | Perdue | 366/339 |
| 2,512,471 | 6/1950 | Trist | 366/339 |
| 3,476,521 | 11/1969 | Wise | 366/336 |
| 3,918,688 | 11/1975 | Huber et al. | 366/341 |
| 5,437,784 | 8/1995 | Meinecke et al. | 261/76 |
| 5,535,175 | 7/1996 | Niimi | 366/336 |

FOREIGN PATENT DOCUMENTS

| | | |
|---|---|---|
| 600937 | 6/1978 | Switzerland . |
| 982729 | 2/1965 | United Kingdom . |
| 9008025 | 7/1990 | WIPO . |
| 9603206 | 2/1996 | WIPO . |

*Primary Examiner*—C. Scott Bushey
*Attorney, Agent, or Firm*—Dennison, Meserole, Scheiner & Schultz

[57] ABSTRACT

A device for fining bubbles of gas contained in liquid includes at least two flow channel members confronting each other to form a flow channel therebetween. An inlet and an outlet are provided on one side and the other side of the flow channel members. A recess surface including a first recess and a second recess is formed on at least one of confronting surfaces of the flow channel members. The first recess and the second recess extend from the inlet to the outlet, respectively, and intersect each other at plural positions where the flow of the liquid premixed with gas in the first recess collides with that in the second recess.

12 Claims, 8 Drawing Sheets

5,938,982

DEVICE FOR FINING BUBBLES OF GAS CONTAINED IN LIQUID

BACKGROUND OF THE INVENTION

1. Field of the Invention

The present invention relates to a device for fining bubbles of gas contained in liquid.

2. Description of the Prior Art

Production of fine bubbles of gas contained in liquid has been desired particularly in a water purification plant, a swimming pool, a manure handling and disposing shed, etc. for improving the dissolving efficiency of ozone gas into water to be purified such as a sewage and a waste water.

In order to produce fine bubbles of gas, there has been proposed a system to use an air intake valve disposed on an inlet side of a pump which is provided in a pipeline for pumping water to be treated. With this conventional measure, the gas is mixed with the water at an inlet of the pump and is then forced to form bubbles by the stirring force applied by impellers of the pump.

Another prior art device for producing fine bubbles of gas comprises an air intake valve and a baffle plate both provided on an outlet side of a pump. With this device, water mixed with the gas or air on the outlet side of the pump collides with the baffle plate, so that the air is forced to form bubbles by the colliding force. Such a system using this device is called "ejector system".

However, with the prior art devices, the formation of the bubbles relies merely upon the stirring force applied from the impeller or the colliding force to the baffle plate, and therefore, the bubbles produced by these devices still have a relatively large diameter and may not provide a satisfactory result. For this reason, these devices have never been practically used for treatment of water in the water purification plant, the swimming pool, and the manure handling and disposing shed described above, where the water is required to be treated by a great flow rate per hour.

SUMMARY OF THE INVENTION

It is, accordingly, an object of the present invention to provide a device which is adapted for fining bubbles of gas contained in liquid and which is operable to provide fine bubbles having a diameter small enough and to provide a great flow rate of the liquid with the gas in the form of such fine bubbles.

According to the present invention, there is provided a device for fining bubbles of gas contained in liquid, comprising:

at least two flow channel members confronting each other to form a flow channel therebetween;

an inlet and an outlet provided on one side and the other side of the flow channel members; and a recess surf ace including a first recess and a second recess and provided on at least one of confronting surfaces of the flow channel members, the first recess and the second recess extending from the inlet to the outlet, respectively, and intersecting each other at plural positions where the flow of the liquid premixed with gas in the first recess collides with that in the second recess.

With this construction, the liquid premixed with gas enters the flow channel through the first recess on one hand and through the second recess on the other side, and the flow of the liquid premixed with the gas in the first recess and the flow of the liquid premixed with the gas in the second recess collide with each other at the first intersection, so that bubbles of the gas are fined. The flow is then divided into the flow on the side of the first recess and the flow on the side of the second recess. Each of the divided flow thereafter collides with the other flow at the next intersection where the bubbles are further fined, and is then again divided to be brought to the subsequent intersection. Thus, the bubbles of the gas contained in the liquid is fined at many times at the intersections, and the liquid containing the fine bubbles is ejected from the outlet.

In a preferred embodiment, the flow channel members comprise an outer flow channel member and an inner flow channel member having cylindrical configurations and disposed coaxially with each other, so that the confronting surfaces comprise an inner surface of the outer flow channel member and an outer surface of the inner flow channel member and that at least one of the inner and outer surfaces comprises the recess surface including the first and second recesses. The first recess is a right-hand helical recess and the second recess is a left-hand helical recess.

With this construction, since the flow channel members have a cylindrical configuration, the device can be easily manufactured. In addition, since the flow channel is also cylindrical, a uniform flow and a uniform mixing operation is performed all over the section of the flow channel, so that the liquid containing homogeneously fined bubbles can be obtained. Further, the helical recess as the first recess or the second recess can be formed by an ordinary thread cutting work, so that the device can be further easily manufactured.

Each of the right-hand helical recess and the left-hand helical recess may be a multi-start recess, so that the number of inlet ports of the flow channel is sum of the number of rows of recess parts of the first recess and the number of rows of recess parts of the second recess, resulting in that a great flow rate can be ensured. In addition, since the number of the intersections may be increased, the fining operation may be sufficiently performed while a great flow rate is ensured.

The recess surface may be formed on only one of the inner surface of the outer flow channel member and the outer surface of the inner flow channel member. With this construction, the flow of the mixed liquid in the radial direction of the flow channel is restrained, so that the colliding operation at the intersections of the helical recesses can be effectively performed and that the fining operation can be excellently performed.

Preferably, a plurality of the inner flow channel members are provided and disposed coaxially with each other, so that an additional flow channel is formed between each two adjoining inner flow channel members which include additional confronting surfaces corresponding to the confronting surfaces. With this construction, in addition to the flow channel between the outer flow channel member and most outward one of the inner flow channel members, the additional flow channel is formed between each of the inner flow channel members. Therefore, a great flow rate can be ensured while the fining operation is sufficiently performed.

The invention will become more fully apparent from the claims and the description as it proceeds in connection with the drawings.

DETAILED DESCRIPTION OF THE PREFERRED EMBODIMENTS

First to third embodiments of the present invention will now be explained with reference to the attached drawings.

Figure 1:
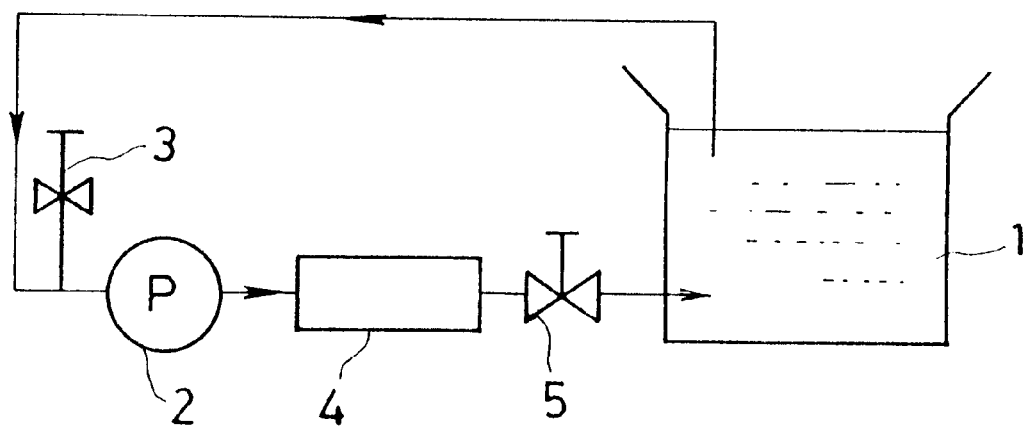
FIG. 1 is a schematic view of a system for producing liquid containing fine bubbles of gas incorporating a device for fining bubbles of gas contained in liquid according to a first embodiment of the present invention.

A system for mixing gas with liquid to produce fine bubbles of the gas is schematically shown in FIG. 1.

The system includes a pump 2 for pumping sewage from a sewage reservoir 1, a gas intake valve 3 for introducing gas such as ozone into a pipeline connecting the sewage reservoir 1 and the pump 2 in a suitable position (immediately before the pump 2 in this embodiment), and a device 4 for fining bubbles of gas contained in liquid according to a first embodiment of the present invention. The liquid or water containing fine bubbles of gas produced by the device 4 is returned to the sewage reservoir 1 via a pressure regulating valve 5.

The air intake valve 3 serves to automatically adjust the flow rate of the intake gas in response to the flow rate of the liquid outputted from the pump 2 such that a uniform mixing rate of the gas with the liquid is always obtained. In addition, the air intake valve 3 is operable to vary the mixing rate itself. As the construction of such an air intake valve, the construction disclosed in Japanese Utility Model Publication No. 57-47439 in the name of the same applicant as the present application may be utilized.

Preferably, as the pump 2, a pump such as a volute pump disclosed in Japanese Laid-Open Patent Publication No. 3-130598 in the name of the same applicant is suitably used for premixing the gas with the liquid.

The construction of the device 4 for fining bubbles will now be explained with reference to FIGS. 2 to 5.

Figure 2:
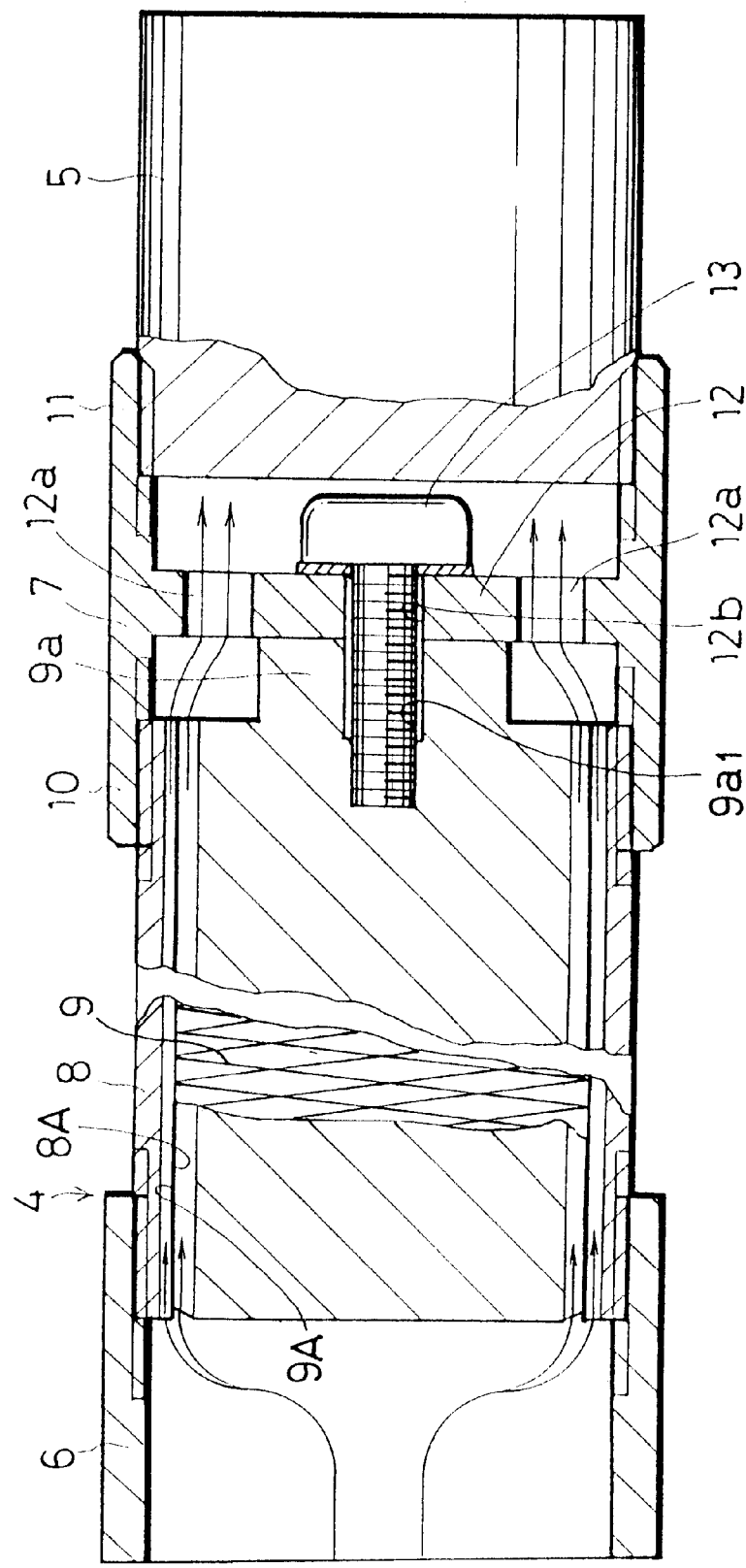
FIG. 2 is a vertical sectional view of the fining device according to the first embodiment of the present invention.
Figure 3:
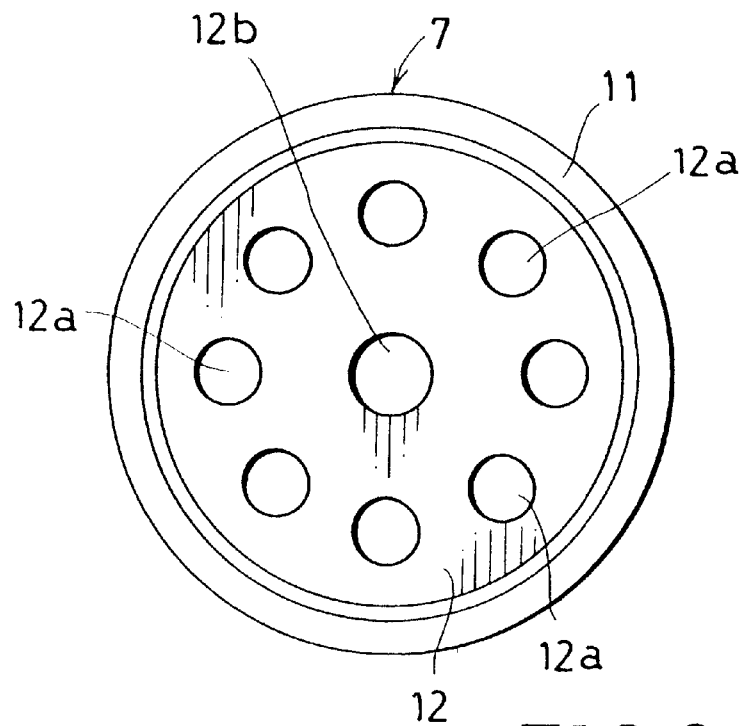
FIG. 3 is a side view of an inlet connection member of the device of the first embodiment.
Figure 4:
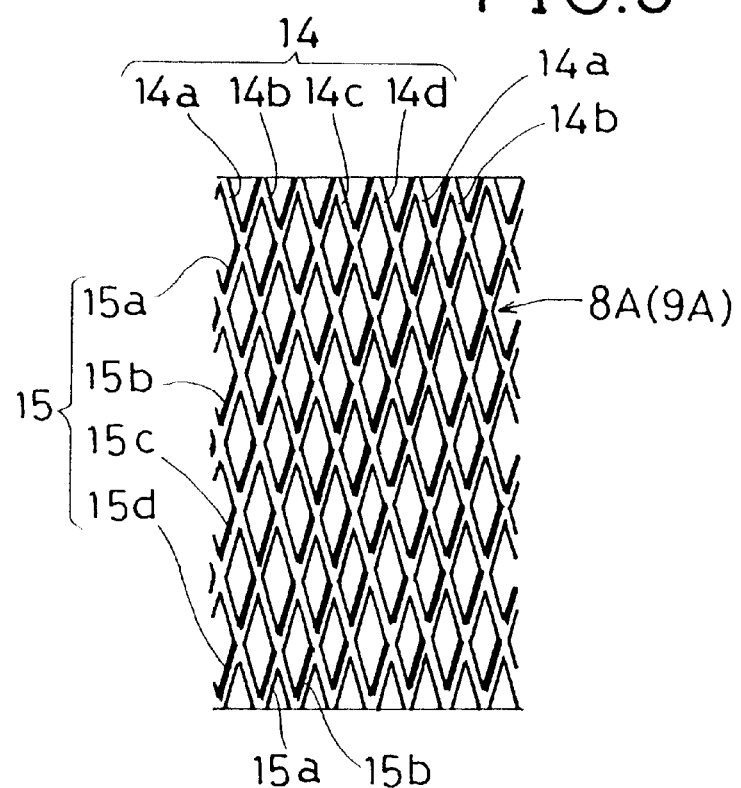
FIG. 4 is a view in developed form of a part of a helical recess surface of an outer flow channel member or an inner flow channel member of the device of the first embodiment.

The whole device 4 is shown in FIG. 2. The device 4 includes a tubular inlet connection member 6 adapted to be connected to the downstream side of the pump 2, an outlet connection member 7 adapted to be connected to the pressure regulating valve 5 described above, a tubular cylindrical outer flow channel member 8, and a solid cylindrical inner flow channel member 9. The outer flow channel member 8 and the inner flow channel member 9 serve to form a flow channel therebetween as will be explained later. The outer flow channel member 8 and the inner flow channel member 9 are fixedly connected between the inlet connection member 6 and the outlet connection member 7 and are disposed coaxially with each other.

The inlet connection member 6 is threadably engaged with an outer surface of one end of the outer flow channel member 8, and the outlet connection member 7 is threadably engaged with an outer surface of the other end of the outer flow channel member 8.

Here, the outlet connection member 7 has one end which includes a flange portion 10 having a female thread for engagement with the outer flow channel member 8, and the outlet connection member 7 has the other end which includes a flange portion 11 having a female thread for engagement with a casing of the pressure regulating valve 5. A middle portion of the outlet connection member 7 between the flange portions 10 and 11 has a disk member 12 formed integrally therewith and disposed therein. The disk member 12 has a plurality of communication holes 12a and a through hole 12b formed therein. The communication holes 12 are arranged on a common circle about the central axis of the disk member 12, and the through hole 12b extends along the central axis of the disk member 12.

In the assembled state of the device 4 shown in FIG. 2, the disk member 12 is in abutment on an end surface of a small diameter protrusion 9a (having a diameter smaller than a diameter of a circle which inscribes on the communication holes 12a). The small diameter protrusion 9a is formed on the inner flow channel member 9 and protrudes therefrom in an axial direction. The outlet connection member 7 and the inner flow channel member 9 are fixed in position relative to each other by tightening a bolt 13 which is inserted into the through hole 12b of the disk portion 12 and which is engaged with a threaded hole 9a1 having a bottom and formed in the small diameter protrusion 9a. Since the outer flow channel member 8 is threadably engaged with the flange portion 10 of the outlet connection member 7 as described above, the inner flow channel member 9 and the outer flow channel member 8 are fixed in position coaxially with the outlet connection member 7.

There is substantially no gap between the inner surface of the outer flow channel member 8 and the outer surface of the inner flow channel member 9, so that the outer flow channel member 8 and the inner flow channel member 9 nearly contact each other. However, the inner surface of the outer flow channel member 8 and the outer surface of the inner flow channel member 9 have a helical recess surface 8A and a helical recess surface 9A, respectively. Each of the helical recess surfaces 8A and 9A includes a right-hand four-start helical recess 14 and a left-hand four-start helical recess 15, so that the helical recess surfaces 8A and 9A form the flow channel between the outer flow channel member 8 and the outer flow channel member 9. The helical recess 14 and the helical recess 15 have the same pitch and the same pitch angle with each other. The helical recess 14 comprises four recess parts 14a to 14d, and the helical recess 15 comprises four recess parts 15a to 15d.

Figure 5:
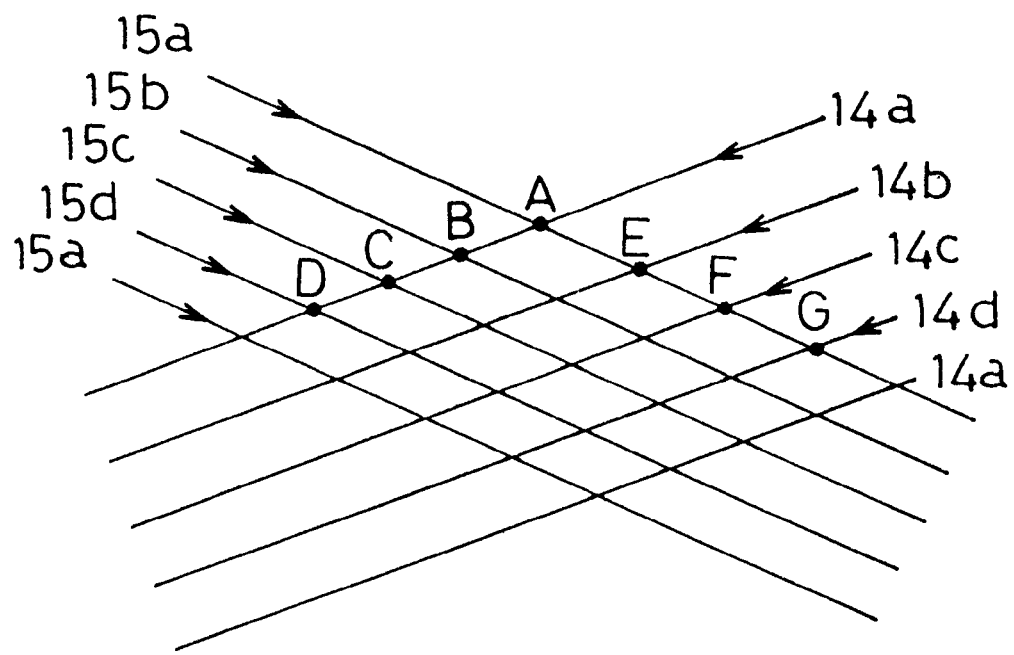
FIG. 5 is an explanatory view schematically showing how the right-hand recess and the left-hand recess intersect each other.

For illustration purpose, the recess parts 14a to 14d of the helical recess 14 and the recess parts 15a to 15d of the helical recess 15 in a part of the helical recess surface 8A (9A) are shown in FIG. 5 by lines representing their bottoms. As will be seen from FIG. 5 the flow of the liquid premixed with the gas which entered the recess part 14a from the inlet side and the flow of the liquid premixed with the gas which entered the recess part 15a collide with each other at a point A and is then divided into the flow on the side of the recess part 14a and the flow on the side of the recess part 15a. The divided flow on the side of the recess part 14a subsequently collides at a point B with the flow in the recess part 15b and is then divided again into the flow on the side of the recess part 14a and the flow on the side of the recess part 15b. The flow on the side of the recess part 14a subsequently collides at a point C with the flow in the recess part 15c and is thereafter divided again into the flow on the side of the recess part 14a and the flow on the side of the recess part 15c. The flow on the side of the recess part 14a subsequently collides at a point D with the flow in the recess part 15d and is then divided again into the flow on the side of the recess part 14a and the flow on the side of the recess part 15d. The flow on the side of the recess part 14a subsequently collides with the flow in the recess part 15a of the next turn.

On the other hand, the mixed flow flown into the recess part 15a from the point A collides at a point E with the flow in the recess part 14b and is then divided into the flow on the side of the recess part 15a and the recess part 14b. The divided flow on the side of the recess part 15a subsequently collides at a point F with the flow in the recess part 14c and is then divided again into the flow on the side of the recess part 15a and the flow on the side of the recess part 14c. The flow on the side of the recess part 15a subsequently collides at a point G with the flow in the recess part 14d and is then divided again into the flow on the side of the recess part 15a and the flow on the side of the recess part 14d. The flow on the side of the recess part 15a subsequently collides with the flow in the recess part 14a of the next turn.

These operations of collision and division of the mixed flow are also performed in connection with the other recess parts.

With the collision and the division of the mixed flow at the intersection of the recess parts, the bubbles of the gas contained in the mixed flow and each still having a relatively large volume are divided to be fined. The fined bubbles are further fined at the next intersection of the recess parts and are still further fined at the subsequent intersection. Since the bubbles in the mixed flow of the liquid with the gas are fined at many times at a number of the intersections, the mixed flow becomes to include very fine bubbles of the gas before reaching the outlet connection member 7. In addition, the flow in the helical recesses 14 an 15 of the helical recess surface 8A and the flow in the helical recesses 14 and 15 of the helical recess surface 9A may be mixed with each other at positions where the recess parts 14a to 14d and 15a to 15d of the helical recess surface 8A and those of the helical recess surface 9A confront each other in the diametrical direction. Thus, the recess parts 14a to 14d and 15a to 15d of the helical recess surface 8A are not required to be positioned in alignment with those of the helical recess surface 9A.

Since the helical recesses 14 and 15 are incorporated in this embodiment, the inlet of the mixed flow includes eight inlet ports or four inlet ports of the helical recess 14 and four inlet ports of the helical recess 15, so that a sufficient flow rate of the mixed flow can be obtained. In addition, the number of the intersections is greater than the number of intersections which may be obtained where single-start recesses are used. Therefore, this embodiment ensures a sufficient flow rate while the bubbles can be sufficiently fined.

Further, with the above embodiment, since the helical recesses 14 and 15 are provided on both the inner surface of the outer flow channel member 8 and the outer surface of the inner flow channel member 9, the flow rate is twice the flow rate which is obtained where the helical recesses 14 and 15 are provided only one of them.

The mixed flow containing the bubbles fined through passage of the flow channel between the outer flow channel member 8 and the inner flow channel member 9 outgoes through the communication holes 12a formed in the disk member 12 of the outlet connection member 7 to return to the sewage reservoir 1 via the pressure regulating valve 5.

The applicant of the present application has obtained the following experimental results through measurement of the fined degree of bubbles using air as the gas and using water as the liquid, with variously changing the output pressure (flow rate) of the pump 2, the mixing rate of air at the gas intake valve 3, and the pressure regulated by the pressure regulating valve 5.

| Result of Experiment | | |
|---|---|---|
| | Experiment A | Experiment B |
| output pressure of pump (Kg/cm2) | 7.0 | 9.0 |
| mixing rate of air (%) | 2–2.5 | 2–2.5 |
| regulated pressure at pressure regulating valve (Kg/cm2) | 6.0 | 8.0 |
| fined degree (second) (time of disappearance of cloudiness) | 120 | 150 |

Throughout the experiments, the outer flow channel member 8 and the inner flow channel member 9 having the specification set forth below have been used. In addition, the measurement of the fined degree was performed using water (which is not sewage but is ordinary city water). The mixed flow was sampled at the downstream side of the pressure regulating valve 5 into a glass beaker (having a capacity of 300 ml) by a level of about 100 mm. The mixed liquid sampled into the beaker has exhibited cloudiness because of smoke-like fine bubbles of air. The time of disappearance of cloudiness was measured after sampling into the beaker until the cloudiness cannot be substantially visually recognized. The time noted in the Result of Experiment is the time thus measured. It may be judged that the fined degree may be higher if the time of disappearance of cloudiness is longer.

| Specification of outer flow channel member and inner flow channel member used in experiments | |
|---|---|
| Outer flow channel member | |
| inner diameter (ridge diameter of helical recess) | 50 mm |
| whole length | 200 mm |
| pitch of helical recess | 4 mm |
| pitch angle of helical recess (for both right and left-hand ones) | 30° |
| depth of helical recess | 2 mm |
| Inner flow channel member | |
| outer diameter (ridge diameter of helical recess) | 50 mm (+0 to −0.15 mm) |
| whole length (excluding length of axial protrusion) | 200 mm |
| pitch of helical recess | 4 mm |
| pitch angle of helical recess (for both right and left-hand ones) | 30° |
| depth of helical recess | 2 mm |

Here, the pitch angle of helical recess means an inclined angle of the helical recess relative to a planer surface which is perpendicular to the longitudinal axis of the outer flow channel member or the inner flow channel member.

As will be seen from the experimental result, an excellent result has been obtained in the Experiment B. The flow rate of the mixed liquid in the Experiment B was 30 l/min or 1800 l/hour which is sufficient for use for a water purification plant, a swimming pool, etc. where a great processing amount is required.

Figure 6:
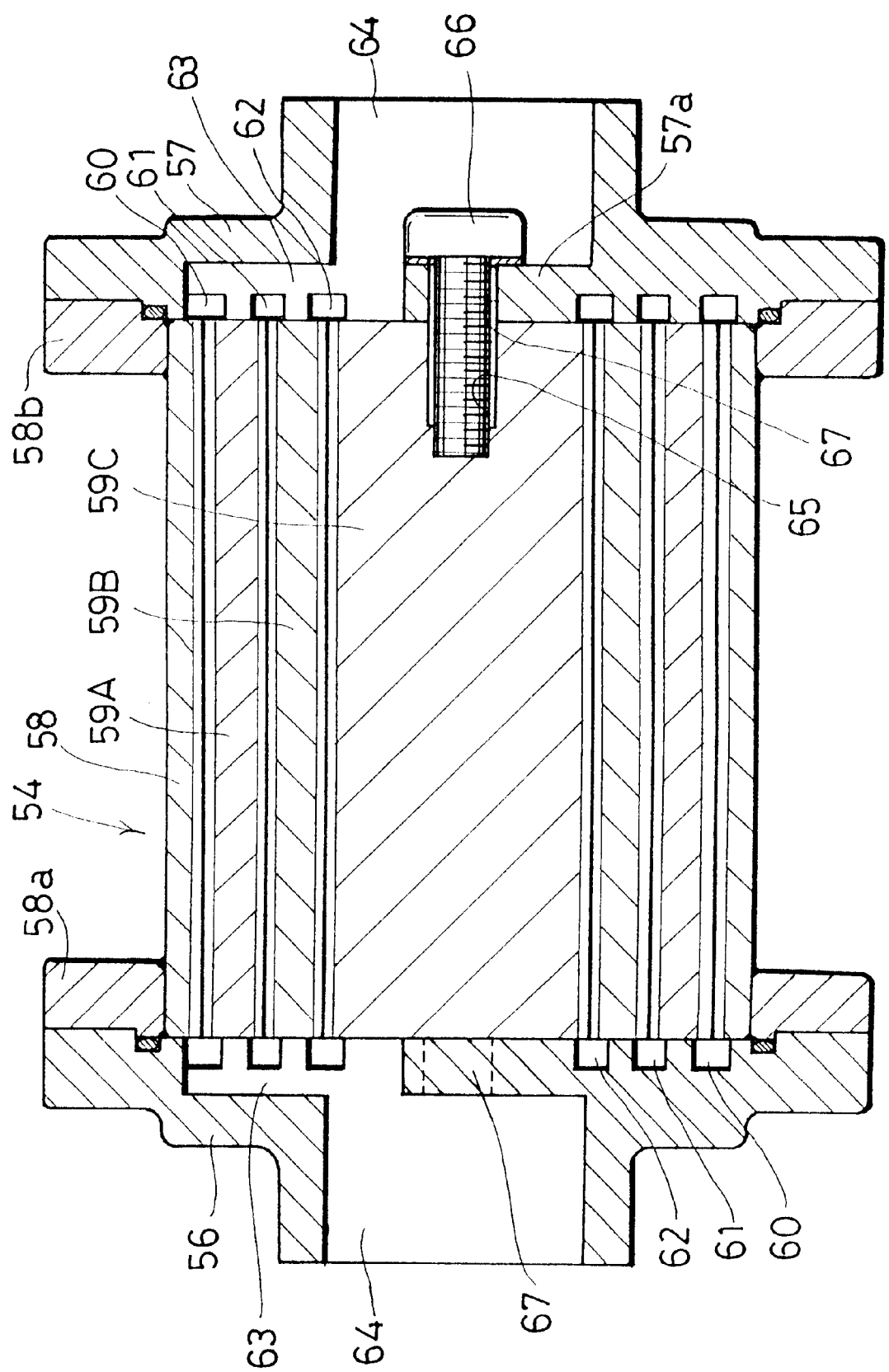
FIG. 6 is a vertical sectional view of a device for fining bubbles contained in liquid according to a second embodiment of the present invention.
Figure 7:
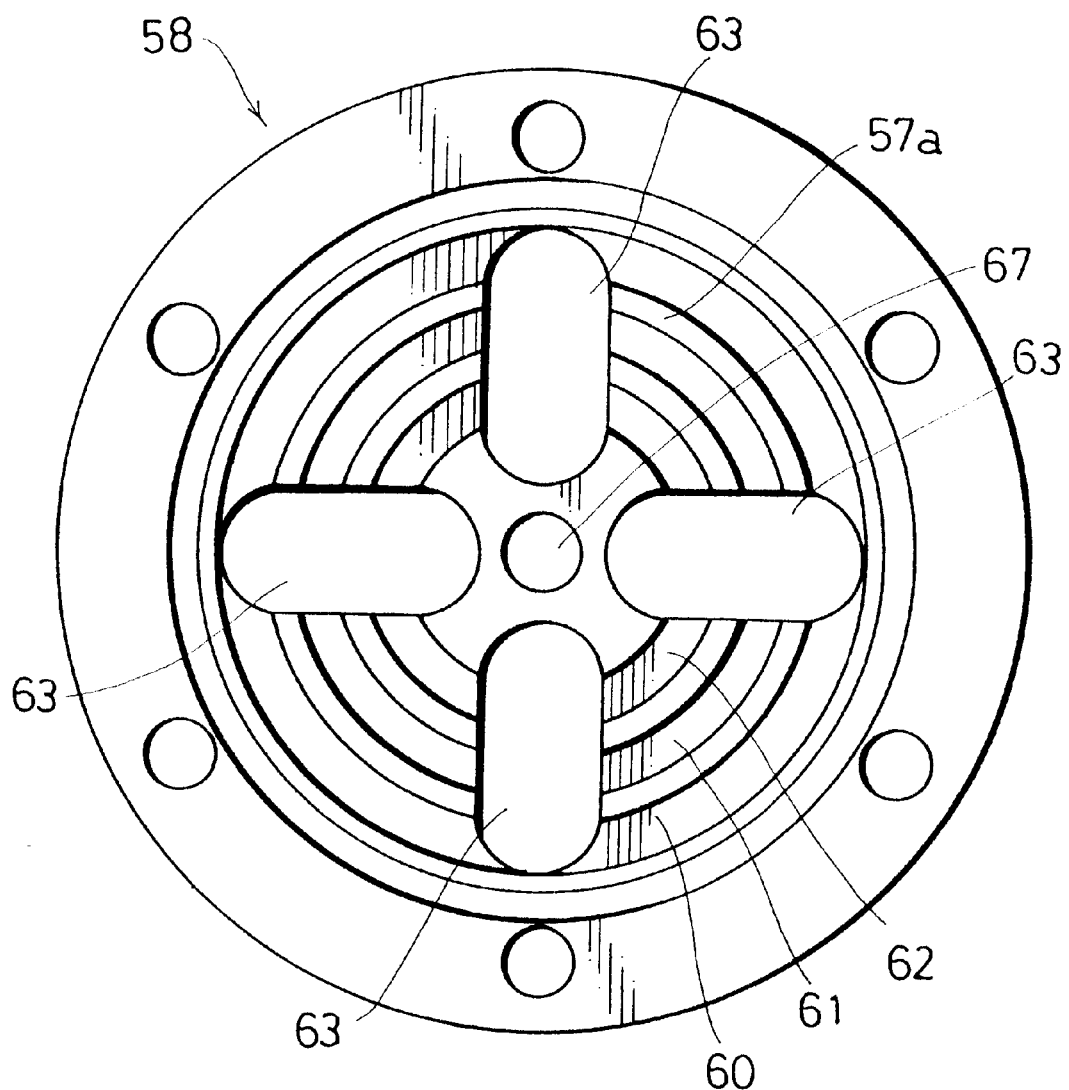
FIG. 7 is a side view of an outlet connection member of the device according to the second embodiment.

In the above embodiment, although one inner flow channel member is provided within the outer flow channel member, the inner flow channel member may be provided in a plural number as in a second embodiment which will be explained with reference to FIGS. 6 and 7.

As with the first embodiment, a device 54 for fining bubbles contained in liquid of the second embodiment includes an inlet connection member 56 for connection to the downstream side of the pump 2, and an outlet connection member 57 for connection to the pressure regulating valve 5. An outer flow channel member 58 and three inner flow channel members 59A, 59B and 59C are fixedly connected between the inlet connection member 56 and the outlet connection member 57 and are disposed coaxially with each other. Here, although each of the outer flow channel member 58 and the inner flow channel members 59A and 59 B has a tubular cylindrical configuration, the inner flow channel member 59C which is one positioned most centrally has a solid cylindrical configuration.

The outer surface of the inner flow channel member 59C and the inner surface of the inner flow channel member 59B disposed outwardly of the inner flow channel member 59C are helical recess surfaces each including a right-hand four-start helical recess and a left-hand four-start helical recess which intersect each other in the same manner as the helical recesses 14 and 15 of the helical recess surfaces 9A (9B) of the first embodiment. The outer surface of the inner flow channel member 59B and the inner surface of the inner flow channel member 59A disposed outwardly of the inner flow channel member 59B are helical recess surfaces each including a right-hand five-start helical recess and a left-hand five-start helical recess which intersect each other. The outer surface of the inner flow channel member 59A and the inner surface of the outer flow channel member 58 are helical recess surfaces each including a right-hand six-start helical recess and a left-and six-start helical recess which intersect each other. The five-start helical recesses as well as the six-start helical recesses intersect each other in the same manner as explained in connection with the four-start helical recesses in the first embodiment with reference to FIG. 5 while the number of their recess parts is greater than the number of the recess parts in the first embodiment. Therefore, the illustration of the five-start helical recesses as well as the six-start helical recesses is omitted.

The specification of an outer flow channel member and inner flow channel members of a typical fining device embodying the second embodiment are as follows:

|  | outer diameter (mm) | inner diameter (mm) |
| --- | --- | --- |
| outer flow channel member 58 | 106 | 93 |
| inner flow channel member 59A | 93 | 70 |
| inner flow channel member 59B | 70 | 49 |
| inner flow channel member 59C | 49 | — |

Here, the outer flow channel member as well as the inner flow channel members has the whole length of 200 mm, and the helical recesses of the helical recess surfaces of the outer flow channel member and the inner flow channel have the same pitch of 3 mm and have the same depth of 2.5 mm.

The inlet connection member 56 is connected to a flange 58a of the outer flow channel member 58 by means of a plurality of bolts (not shown). The flange 58a is fixed to the outer periphery of one end of the outer flow channel member 58 by means of welding or like. On the other hand, the outlet connection member 57 is connected to a flange 58b of the outer flow channel member 58 by means of a plurality of bolts (not shown). The flange 58b is fixed to the outer periphery of the other end of the outer flow channel member 58 by means of welding or like.

The construction of the inlet connection member 56 is substantially the same as the construction of the outlet connection member 57, and therefore, the explanation will be made only to the outlet connection member 57. The outlet connection member 57 includes an abutting portion 57a for abutment on the outer flow channel member 58 and three inner flow channel members 59A, 59B and 59C in their axial direction. As shown in FIG. 7, the abutting portion 57a includes annular grooves 60, 61 and 62 which are disposed coaxially with each other and axially confront the four-start helical recesses of the outer flow channel member 58 and the inner flow channel member 59A, the five-start helical recesses of the inner flow channel member 59A and the inner flow channel member 59B, and the six-start helical recesses of the inner flow channel member 59B and the inner flow channel member 59C, respectively.

In addition, the abutting portion 57a includes four radial communication slots 63 formed therein. The communication slots 63 are spaced from each other in the circumferential direction and serve to connect the annular grooves 60, 61 and 62 to each other. One end of each of the communication slots 63 in a direction toward the central axis of the abutting portion 57a is in communication with a communication hole 64 formed in the outlet connection member 57 in its axial direction. Further, the abutting portion 57a has a through hole 67 formed therein for receiving a bolt 66 which is in engagement with a threaded hole 65 formed in the solid inner flow channel member 59C which is disposed most centrally, so that the outlet connection member 57 is fixed in position relative to the inner flow channel member 59C by tightening the bolt 66. The construction of the inlet connection member 56 is the same as the construction of the outlet connection member 57 as described above and its explanation will be omitted while like parts are given the same reference numerals in the drawings. The through hole 67 of the inlet connection member 56 is however not used for receiving a bolt.

With this embodiment, the sewage or the liquid supplied from the reservoir 1 and premixed with the gas the pump 2 enters the communication hole 64 of the inlet connection member 56 and subsequently enters the annular grooves 60, 61 and 62 via communication slots 63 formed at four positions. The premixed liquid then enters a first flow channel between the outer flow channel member 58 and the inner flow channel member 59A, a second flow channel between the inner flow channel member 59A and the inner flow channel member 59B, and a third flow channel between the inner flow channel member 59B and the inner flow channel member 59C to flow therethrough, so that the collision and the division of the premixed liquid is repeatedly performed in each flow channel by the combination of the right-hand recess and the left-hand recess of the helical recess surface as explained in connection with the first embodiment. The mixed flows in the first to third flow channels then enter their corresponding grooves 60, 61 and 62 and go out from the communication hole 64 via the connecting slots 63 to return to the sewage reservoir 1 via the pressure regulating valve 5.

As described above, with this embodiment, a plurality of flow channels are provided coaxially with each other, and each of the flow channels serves to fine the bubbles by the dividing and colliding operation as in the first embodiment. Therefore, a great flow rate can be obtained while the device may have a compact construction since the size of the whole device is not required to be enlarged.

In addition, with the provision of the coaxial flow channels, the path length along each recess part of the flow channel positioned on the outer side may be longer than that of the flow channel positioned on the inner side, and the distance between the intersections of the recess parts of the former may be also longer than that of the latter. For this reason, with this embodiment, the number of rows of the recess parts in each helical recess of the flow channel positioned on the outer side is greater than that of the flow channel positioned on the inner side. Therefore, the distance between the intersections is substantially uniform throughout the flow channels, so that the fining operation in three flow channels may be uniformly performed.

Figure 8:
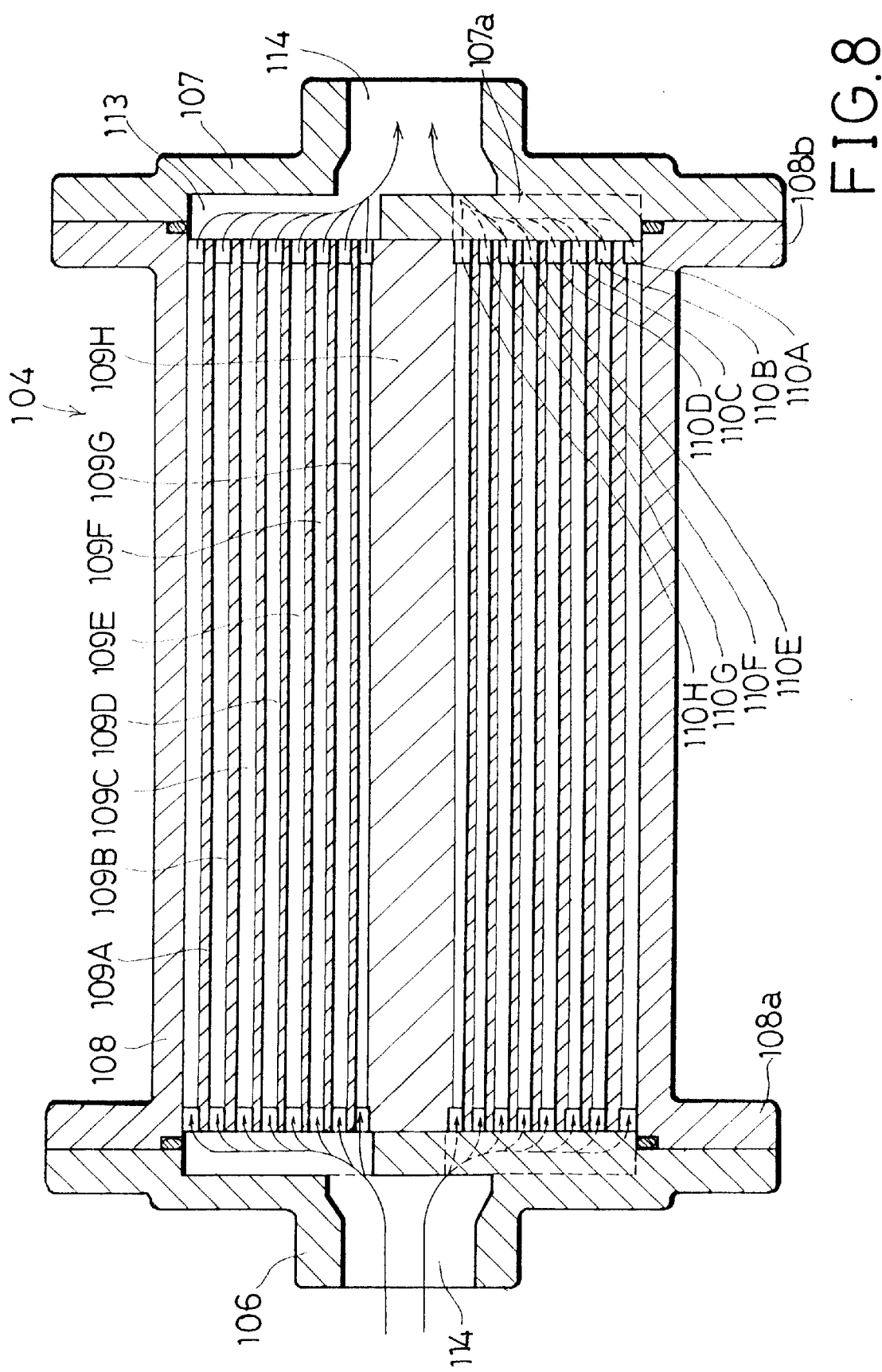
FIG. 8 is a vertical sectional view of a device for fining bubbles contained in liquid according to a third embodiment of the present invention.
Figure 9:
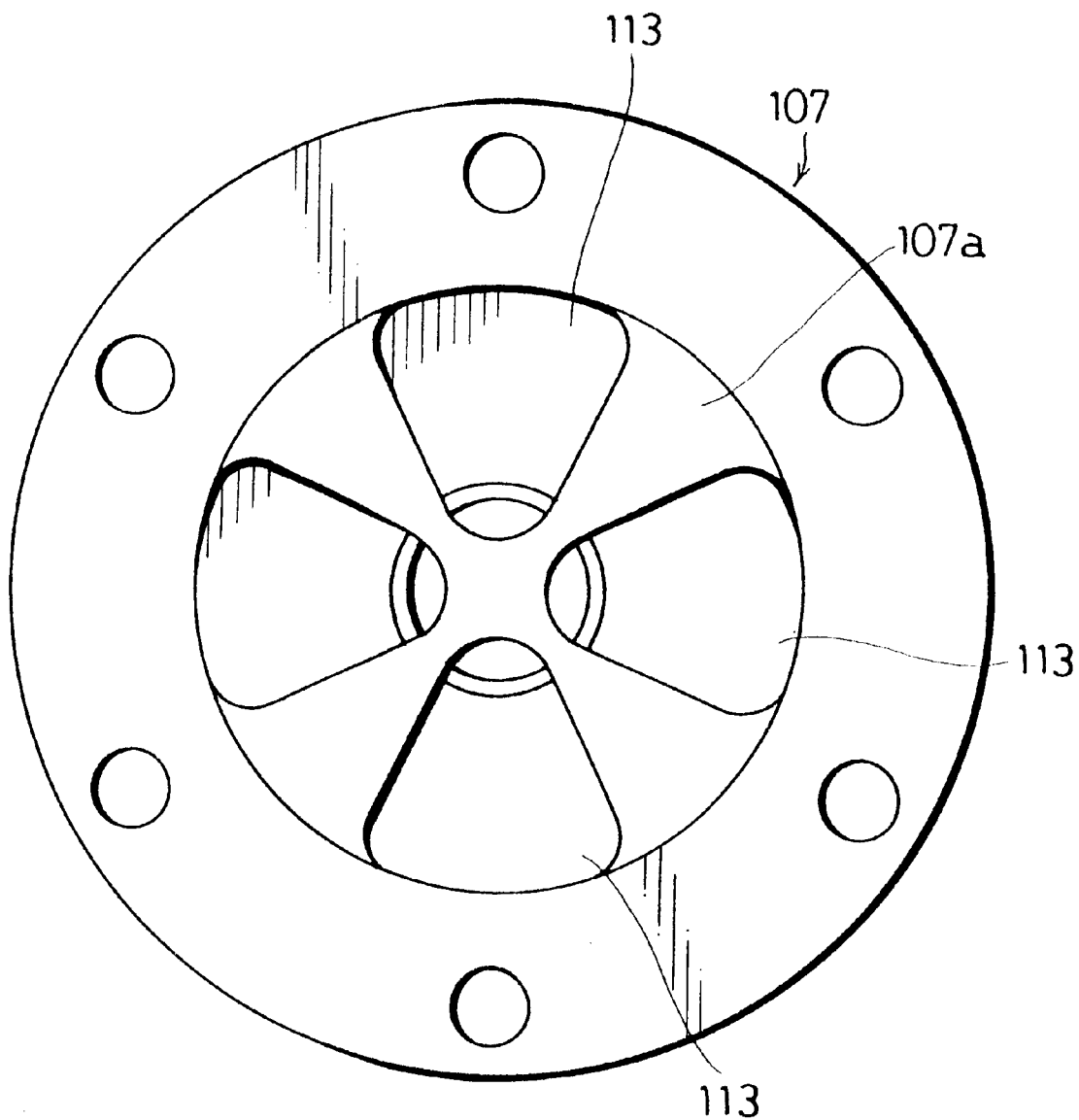
FIG. 9 is a side view of an outlet connection member of the device according to the third embodiment.

A third embodiment which includes eight inner flow channel members within an outer flow channel member will now be explained with reference to FIGS. 8 and 9.

As with the second embodiment, a device 104 for fining bubbles of gas contained in liquid of this embodiment includes an inlet connection member 106 for connection to the downstream side of the pump 2, and an outlet connection member 107 for connection to the pressure regulating valve 5. An outer flow channel member 108 and eight inner flow channel members 109A to 109H are fixedly connected between the inlet connection member 106 and the outlet connection member 107 and are disposed coaxially with each other. Here, although each of the outer flow channel member 108 and the inner flow channel members 109A to 109G has a tubular cylindrical configuration, the inner flow channel member 109H which is one positioned most centrally has a solid cylindrical configuration.

The outer surface of the inner flow channel member 109A is a helical recess surface including a right-hand eight-start helical recess and a left-hand eight-start helical recess which intersect each other. The outer surface of the inner flow channel member 109B is a helical recess surface including a right-hand seven-start helical recess and a left-hand seven-start helical recess which intersect with each other. The outer surface of the inner flow channel member 109C is a helical recess surface including a right-hand six-start helical recess and a left-hand six-start helical recess which intersect each other. The outer surface of the inner flow channel member 109D is a helical recess surface including a right-hand five-start helical recess and a left-hand five-start helical recess which intersect each other. The outer surface of the inner flow channel member 109E is a helical recess surface including a right-hand four-start helical recess and a left-hand four-start helical recess which intersect each other. The outer surface of the inner flow channel member 109F is a helical recess surface including a right-hand three-start helical recess and a left-hand three-start helical recess which intersect each other. The outer surface of the inner flow channel member 109G is a helical recess surface including a right-hand two-start helical recess and a left-hand two-start helical recess which intersect each other. The outer surface of the inner flow channel member 109H is a helical recess surface including a right-hand single-start helical recess and a left-hand single-start helical recess which intersect each other.

This embodiment is different from the first and second embodiments in that the inner surface of the outer flow channel member 108 and the inner surfaces of the inner flow channel members 109A to 109G have no helical recess but are smoothed. Therefore, a flow channel having a smooth surface on the outer side and having a helical recess surface on the inner side is formed between each of the outer flow channel member 108 and the inner flow channel members 109A to 109H.

The specification of an outer flow channel member and inner flow channel members of a typical fining device embodying the third embodiment are as follows:

|  | outer diameter (mm) | inner diameter (mm) |
| --- | --- | --- |
| outer flow channel member 108 | 114 | 100 |
| inner flow channel member 109A | 100 | 88 |
| inner flow channel member 109B | 88 | 76 |
| inner flow channel member 109C | 76 | 65 |
| inner flow channel member 109D | 65 | 54 |
| inner flow channel member 109E | 54 | 44 |
| inner flow channel member 109F | 44 | 34 |
| inner flow channel member 109G | 34 | 24 |
| inner flow channel member 109H | 24 | — |

Here, the outer flow channel member as well as the inner flow channel members has the whole length of 200 mm, and the helical recesses of the helical recess surfaces of the outer flow channel member and the inner flow channel members have the same pitch of 4.5 mm and have the same depth of 3 mm.

The inlet connection member 106 is connected to a flange 108a of the outer flow channel member 108 by means of a plurality of bolts (not shown). The flange 108a is fixed to the outer periphery of one end of the outer flow channel member 108 by means of welding or like. On the other hand, the outlet connection member 57 is connected to a flange 58b of the outer flow channel member 58 by means of a plurality of bolts (not shown). The flange 58b is fixed to the outer periphery of the other end of the outer flow channel member 58 by means of welding or like.

The construction of the inlet connection member 106 is substantially the same as the construction of the outlet connection member 107 and is also basically the same as the inlet connection member 56 and the outlet connection member 57 of the second embodiment. Therefore, the explanation will be made only to the outlet connection member 107. The outlet connection member 107 includes an abutting portion 107a for abutment on the eight inner flow channel members 109A to 109H in their axial direction. The eight inner flow channel members 109A to 109H have end surfaces which confront the abutting portion 107a and which include coaxial annular grooves 110A to 110H formed on their outer peripheral side in communication with their corresponding flow channels.

In addition, the abutting portion 107a includes four radial communication slots 113 formed therein, and the annular grooves 110A to 110H are open into the communication slots 113. The communication slots 113 are spaced from each other in the circumferential direction. One end of each of the communication slots 113 in a direction toward the central axis of the abutting portion 157a is in communication with a communication hole 114 formed in the outlet connection member 107 in its axial direction. Further, the abutting portion 107a has a through hole (not shown) formed therein for receiving a bolt (not shown) which is screwed into one end of the solid inner flow channel member 109H disposed most centrally, so that the outlet connection member 107 is fixed in position relative to the inner flow channel member 109H by tightening the bolt.

With this embodiment, the sewage or the liquid supplied from the reservoir 1 and premixed with the gas at the pump 2 enters the communication hole 114 of the inlet connection member 106 and subsequently enters the annular grooves 110A to 110H in the ends of the inner flow channel members 109A to 109H via the communication slots 113 formed at four positions. The premixed liquid then enters the flow channels between each of the outer flow channel member 108 and the inner flow channel members 109A to 109H, so that the collision and the division of the premixed liquid is repeatedly performed in each flow channel at the intersections of the right-hand helical recess and the left-hand helical recess of the helical recess surface as explained in connection with the first and second embodiments. The mixed flow in the flow channels then enter the corresponding grooves 110A to 110H on the side of the outer connection member 107 and goes out from the communication hole 114 via the connecting slots 113 to return to the sewage reservoir 1 via the pressure regulating valve 5.

With this embodiment, each of the flow channels has a smooth surface on its outer side, and the helical recess surface is provided only on the inner side of each flow channel. Therefore, in comparison with the first and second embodiments in which the helical recess surface is provided on both inner and outer side of each flow channel, the flow of the mixed liquid in the direction outwardly and inwardly in the radial direction is restrained, and the height of each flow channel in the radial direction is relatively small. Therefore, the operation of collision at the intersections of the recess parts can be effectively performed, and this embodiment is advantageous in that the fining efficiency can be improved in comparison with the flow channel having the helical recess surfaces on both inner and outer sides.

With this embodiment, since each of the flow channel is small in height as described above, the flow rate in each of the flow channel may be lower than that of the flow channel of the first and second embodiments. However, with this embodiment, the inner flow channel members 109A to 109H are eight in number which is greater than the number of the flow channels of the first and second embodiments. Therefore, the total flow rate is by no means inferior to that obtained in the second embodiment. Thus, by appropriately determining the number of the inner flow channel members according to the desired flow rate, the mixed liquid having an appropriate flow rate and containing very fine bubbles of gas can be obtained.

In addition, also with this embodiment, the number of the recess parts in each helical recess of the flow channel on the outer side is greater than that of the flow channel on the inner side, so that the distance between the intersections is substantially uniform throughout the flow channels. Therefore, the fining operation in the eight flow channels may be uniformly performed.

With the third embodiment, although the inner surface of each of the outer flow channel member 108 and the inner flow channel members 109A to 109H is formed as a smooth surface to improve the fining efficiency, such a flow channel having a helical surface on one side and having a smooth surface on the other side may be provided also in the device of the second embodiment by inserting cylindrical tubes with smooth inner and outer surfaces between the outer flow channel member 58 and the inner flow channel member 59A, between the inner flow channel member 59A and the inner flow channel member 59B, and between the inner flow channel member 59B and the inner flow channel member 59C. Thus, each of the flow channels is divided into a first flow channel having an outer helical recess surface and an inner smooth surface and a second flow channel having an outer smooth surface and an inner helical recess surface.

In the second and third embodiments, although the pitch of the helical recesses is uniform throughout the flow channels, it may be differently determined in response to the difference in diameter of the flow channel members such that the pitch of the helical recesses of the flow channel member on the inner side is greater than that of the flow channel member on the outer side. In particular, by appropriately determining both the number of rows of the recess parts of the helical recess and the pitch of the recess parts of the helical recess parts to be different in each flow channel member (for example, by determining the number of rows and the pitch such that the flow channel member on the inner side has a smaller number of the rows and has a greater pitch than those of the flow channel member on the outer side), a uniform flow rate and a uniform fined degree of the bubbles throughout the flow channels may be easily obtained to provide the liquid containing fined bubbles with excellent homogeneousness.

In addition, it is preferable that the pitch angle of the recess parts of the helical recess (the angle of the recess parts relative to the plane which is perpendicular to the axis of the outer flow channel member or the inner flow channel member) is determined in response to the depth of the ejecting point of the fined mixed flow measured from the level of the sewage in the reservoir 1. For example, in case of the device of the third embodiment, if the ejecting point is at the depth of 1 m from the level of the sewage, the pitch angle of the recess parts of the helical recess surface of each of the inner flow channel members 109A to 109H is preferably determined as an angle of about 15°. As the depth at the ejecting point increases, the pitch angle may be increased from 15° to a greater angle (such as 17° and 18°).

Thus, a device suitable to an aimed use can be designed by appropriately determining various parameters including the inner diameter of the outer flow channel member, the inner and outer diameters of the inner flow channel member (s), the pitch of the recess parts of the helical recess surface, the number of rows of the recess parts, the pitch angle of the recess parts, etc.

Further, in the first to third embodiments, although the recess in a helical form is used, such a recess may be of any other form than helical. Thus, a plurality of recesses which are straight or curved in developed form and extend from the inlet side to the outlet side may be formed such that they intersect each other at plural positions. For example, there may be provided a plurality of parallel first recesses equally spaced from each other in the circumferential direction and a plurality of parallel second recesses equally spaced from each other in the circumferential direction and intersecting the first recesses. Here, each of the first recesses extends from the inlet side to the outlet side and is twisted in a right-hand direction, and each of the second recesses extends from the inlet side to the outlet side and is twisted in a left-hand direction.

The recess in helical configuration as in the first to third embodiments is advantageous since such a helical recess can be easily formed by an ordinary thread cutting work and since such a helical recess may provide a smooth flow of the mixed liquid.

Further, the flow channel members may have other configurations than cylinder. For example, the flow channel members may be parallel flat-plates confronting each other. The flat-plates have an inlet side and an outlet side in a longitudinal direction and have both lateral sides closed to form a flow channel between each of the flat-plates. A plurality of straight or curved recesses extending from the inlet side to the outlet side and intersecting each other may be formed on one or both of two confronting surfaces of the flat-plates in the same manner described above. With this construction, the fining effect of the bubbles may be also obtained by the mixing operation at the intersections. However, with this construction, it is difficult to uniformly distribute the recesses all over the section of the flow channel and the flow may be influenced by the closed lateral sides. Therefore, this construction is disadvantageous since the mixed liquid may not flow uniformly all over the section of the flow channel.

Therefore, in order to obtain a uniform flow all over the section of the flow channel and to obtain a mixed liquid containing uniform fine bubbles, it is most preferable that the flow channel members have a cylindrical configuration as disclosed in the first to third embodiments.

Furthermore, although the devices of the above embodiments may be advantageously used for the purpose of efficiently dissolving ozone as the gas into sewage to be treated, they may be also used for dissolving other gas such as air or oxygen than ozone into water or may be extensively used for every applications where liquid containing fine bubbles is required and where the gas is not necessary to be dissolved into the liquid.

While the invention has been described with reference to preferred embodiments thereof, it is to be understood that modifications or variations may be easily made without departing from the spirit of this invention which is defined by the appended claims.

What is claimed is:

1. A device for fining bubbles of gas contained in liquid, comprising:

at least two flow channel members having surfaces confronting each other to form a flow channel therebetween, said flow channel members comprising an outer flow channel member and an inner flow channel member having cylindrical configurations and disposed coaxially with each other, so that said confronting surfaces comprise an inner surface of said outer flow channel member and an outer surface of said inner flow channel member;

an inlet provided on one side of said flow channel members constructed and arranged for receiving a supply of liquid premixed with gas, and an outlet provided on an opposite side of said flow channel members; and a recess surface including a first recess and a second recess and formed on at least one of confronting surfaces of said flow channel members, said first recess and said second recess extending from said inlet to said outlet, respectively, and intersecting each other at plural positions where the flow of the liquid premixed with gas in said first recess collides with that in said second recess;

at least one of said inner and outer surfaces comprising said recess surface including said first and second recesses, said first recess being a right-hand helical recess and said second recess being a left-hand helical recess.

2. The device as defined in claim 1 wherein each of said right-hand helical recess and s aid left-hand helical recess is a multi-start helical recess.

3. The device as defined in claim 1 wherein said recess surface is formed on only one of said inner surface of said outer flow channel member and said outer surface of said inner flow channel member.

4. The device as defined in claim 1 wherein a plurality of said inner flow channel members are provided and disposed coaxially with each other, and wherein an additional flow channel is formed between each two adjoining said inner flow channel members which include additional confronting surfaces corresponding to said confronting surfaces.

5. The device as defined in claim 1 wherein said recess surfaces each including said first and second recesses are formed on both said inner surface of said outer flow channel member and said outer surface of said inner flow channel member.

6. The device as defined in claim 4 wherein said right and left-hand spiral recesses for each of said flow channels have the same pitch and the same number of rows of recess parts, and wherein the number of rows of recess parts of said right and left-hand spiral recesses for each of said flow channels is greater than that positioned inwardly thereof.

7. The device as defined in claim 4 further including an inlet connection member and an outlet connection member disposed on an inlet side and an outlet side of said flow channel members, respectively;

each of said inlet and outlet connection members including an abutting member and an axial hole formed on an opposite side of said abutting member in an axial direction, said abutting member abutting said flow channel members;

said abutting member having a plurality of annular grooves opposing said flow channels, respectively, and a plurality of radial communication slots spaced from each other in the circumferential direction, said radial communication slots connecting said annular grooves to each other and being in communication with said axial hole.

8. A system comprising the device of claim 1, in combination with premixing means for premixing gas with liquid, in flow communication with the inlet for providing liquid premixed with gas to said flow channel of the device.

9. The system as defined in claim 8 wherein said premixing means comprises a pump and an air intake valve.

10. The system as defined in claim 8 wherein said recess surfaces each including said first and second recesses are formed on both said inner surface of said outer flow channel member and said outer surface of said inner flow channel member.

11. The system as defined in claim 8 wherein:

a plurality of said inner flow channel members are provided and disposed coaxially with each other;

an additional flow channel is formed between each two adjoining said inner flow channel members which include additional confronting surfaces corresponding to said confronting surfaces; and said right and left-hand spiral recesses for each of said flow channels have the same pitch and the same number of rows of recess parts, and wherein the number of rows of recess parts of said right and left-hand spiral recesses for each of said flow channels is greater than that positioned inwardly thereof.

12. The system as defined in claim 8 wherein:

a plurality of said inner flow channel members are provided and disposed coaxially with each other;

an additional flow channel is formed between each two adjoining said inner flow channel members which include additional confronting surfaces corresponding to said confronting surfaces; and an inlet connection member and an outlet connection member are disposed on an inlet side and an outlet side of said flow channel members, respectively;

each of said inlet and outlet connection members includes an abutting member and an axial hole formed on an opposite side of said abutting member in the axial direction, said abutting member abutting said flow channel members;

said abutting member having a plurality of annular grooves opposing said flow channels, respectively, and a plurality of radial communication slots spaced from each other in the circumferential direction, said radial communication slots connecting said annular grooves to each other and being in communication with said axial hole.

* * * * *